Patented Mar. 20, 1923.

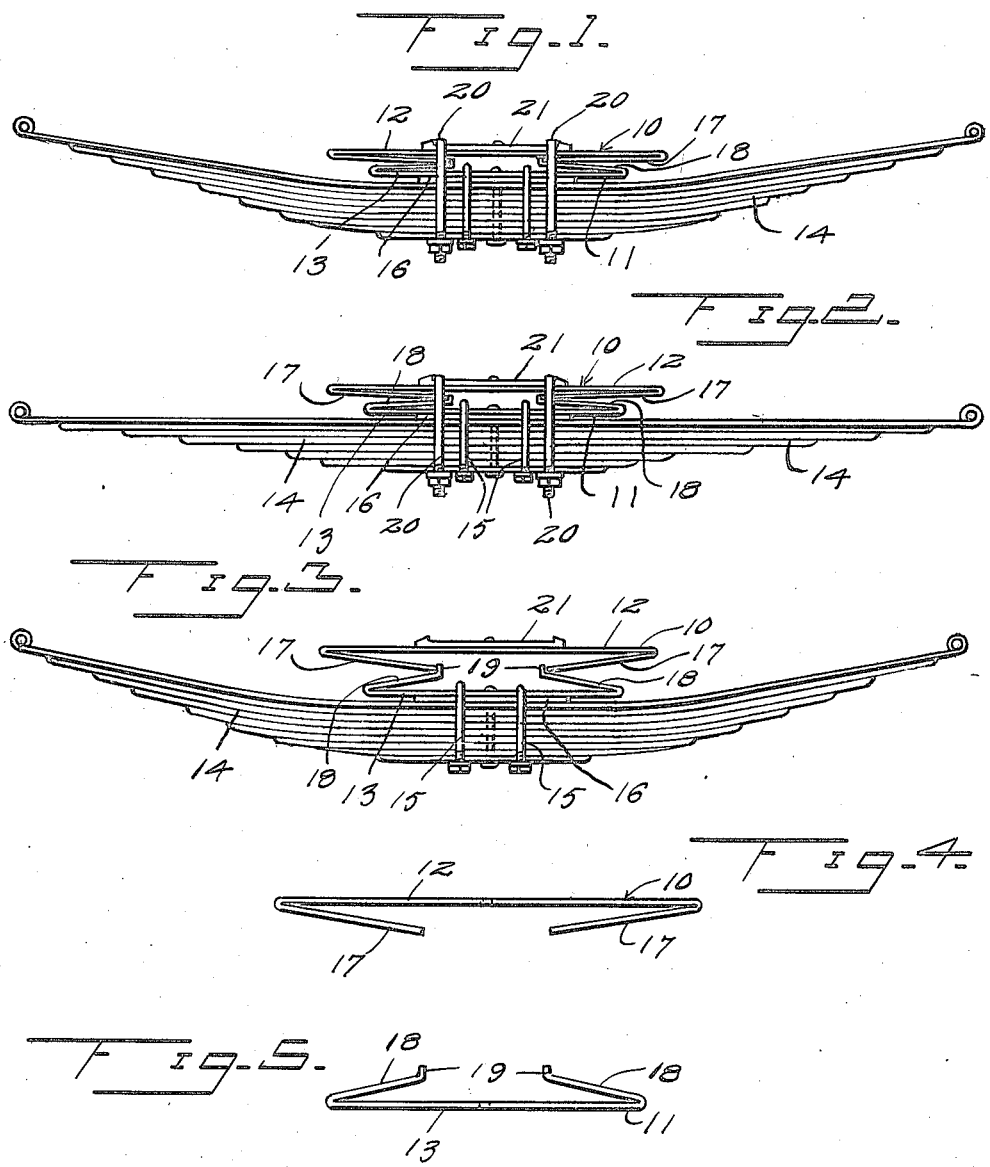

1,449,270

UNITED STATES PATENT OFFICE.

WILLIAM A. CROOK, OF BREWTON, ALABAMA.

SHOCK ABSORBER.

Application filed March 7, 1921. Serial No. 450,139.

*To all whom it may concern:*

Be it known that I, WILLIAM A. CROOK, a citizen of the United States, residing at Brewton, in the county of Escambia and State of Alabama, have invented certain new and useful Improvements in a Shock Absorber; and I do hereby declare the following to be a full, clear, and exact description of the invention, such as will enable others skilled in the art to which it appertains to make and use the same.

The object of the invention is to provide a simple, inexpensive and efficient construction of shock absorbing means constituting an improvement upon the construction illustrated in my copending application #371,615, filed April 6, 1920, and affording increased resilience of the cushion both in resisting the downward impact of the body of the car and the upward or rebounding movement of the arms of the vehicle spring which as in the former instance are of the elliptical type ordinarily employed in connection with automobiles and similar vehicles; and with these objects in view the invention consists in a construction, combination and arrangement of parts of which a preferred embodiment is shown in the drawing, wherein:

Figure 1 is a view of the shock absorber applied in the operative position to a vehicle spring.

Figure 2 is a similar view showing the vehicle spring under stress as when the wheels of the car encounter an obstruction or drop into a depression causing a sudden downward movement of the body of the car tending to flatten the vehicle spring.

Figure 3 is a view of the cushion spring applied to the vehicle spring without the retaining or restraining clips, or before said cushion spring is placed under tension.

Figures 4 and 5 are detail views of the members the cushion spring.

The cushion spring representing the shock absorbing device consists of upper and lower members, 10 and 11, preferably formed independently and having respectively substantially flat body portions 12 and 13 of which the latter is adapted for attachment to the vehicle spring 14 as by engagement with the spring clips 15 by which the vehicle spring is secured to the axle, and resting upon the usual clip or wear plate 16, which however, forms no part of the present invention. It will be understood moreover that while the cushion spring is shown in the drawings as arranged with the body portion of the lower member under and engaged by the spring clips 15, this is not an indispensable arrangement as said lower member may be arranged upon the upper side of the clips, although the illustrated arrangement may be preferred by reason of bringing the body portion of the lower member closer into the plane of the upper surface of the elliptical vehicle spring of which the arms or extremities, extending oppositely from the securing clips 15, are subject to vertical vibration due to the movements of the body of the vehicle.

The extremities of the upper and lower members of the cushion spring which are extended longitudinally of and above the vehicle spring as indicated and of which the upper member is of considerably greater length than the lower member, are provided with return bends forming terminal arms 17 and 18 of which the extremities are arranged in engagement and are preferably interlocked by providing the arms 18 of the lower member with lugs 19 to fit between the extremities of the arms 17 of the upper member as shown clearly in Figure 3, the arms 17 and 18 being arranged relatively in inwardly convergent relation and being respectively arranged in inwardly divergent relation with the body portions of the members of which they form parts.

The cushion in its operative condition is held under compression as indicated in Figures 1 and 2 by means of the cushion clips 20, spaced apart as shown in the drawing at a greater interval than the spring clips 15 by which the vehicle spring is secured to the axle and bearing at their upper ends upon a suitable clip plate 21 or equivalent thereof.

The tension of the cushion serves to slightly deflect the body portion of the lower member by reason of the fact that the ends of said body member are unsupported, to arrange the same closer to the surface of the vehicle spring and such compression also serves to reduce the angles between the arms and the body portions of the members of the device and between the inwardly convergent arms 17 and 18 of the two members, but should not be to such an extent to bring the parts into contact. The body portions of the members are spaced vertically as are the adjacent arms formed by the returned extremities of the members, so that there is room for cushioning movement when the body of the car by reason of a heavy jar is brought into contact with the same, and upon the rebound or back lash of the vehicle spring tending to cause a movement of the arms thereof beyond the normal position, the extremities of the members of the cushion impede such movement and serve to cushion the same and therefore to relieve shock and jar upon the body of the vehicle.

The arms formed by the returned extremities of the members of the cushion are reduced toward their extremities as indicated and such reduction may be to a greater or less extent according to the resistance which the device is desired to exert and the weight of the car in connection with which the device is to be employed.

Having thus described the invention, what I claim is:—

1. A shock absorber for vehicle springs comprising upper and lower members extending longitudinally of the vehicle spring, arms carried by each of said members and extending toward the other of said members, one pair of said arms carrying lugs at their free ends and the free ends of the other arms contacting with said lugs, and fasteners surrounding said members.

2. A shock absorber for vehicle springs comprising upper and lower members extending longitudinally of the vehicle spring, arms carried by each of said members and extending toward the other of said members, one pair of said arms carrying lugs at their free ends, and the free ends of the other of said arms contacting with said lugs, means to secure the lower member to a vehicle spring, and means to secure the upper member in position and maintain the arms under tension.

3. A shock absorber for vehicle springs comprising upper and lower elongated members of elastic material and the lower of said members being shorter than the upper member and resting on and adapted to be secured to the vehicle spring, said upper member extending longitudinally of said vehicle spring, said upper and lower members having converging arms contacting with each other, lugs on the lower arms engaged by the upper arms, means to secure the lower member to the vehicle spring, and means to secure the upper member in position and maintain the intermediate arms under tension.

4. A shock absorber for vehicle springs comprising upper and lower elongated members positioned longitudinally of a vehicle spring, means securing the lower of said members to the spring, said lower member having its ends bent to provide a pair of upwardly converging arms provided at their free ends with vertically extending lugs, said upper member having its ends bent to provide a pair of downwardly converging arms, the arms of the upper member engaging and resting upon the arms of the lower member, the free ends of the arms of the upper member engaging the lugs of the lower member, and means encircling said members and securing the same to the vehicle spring.

In testimony whereof I affix my signature in presence of two witnesses.

WILLIAM A. CROOK.

Witnesses:
  LILY M. TIPPINS,
  ED LEIGH MCMULLEN.